Jan. 7, 1930. S. L. GOKHALE 1,742,990
MAGNETIC TESTING APPARATUS
Filed Oct. 8, 1924
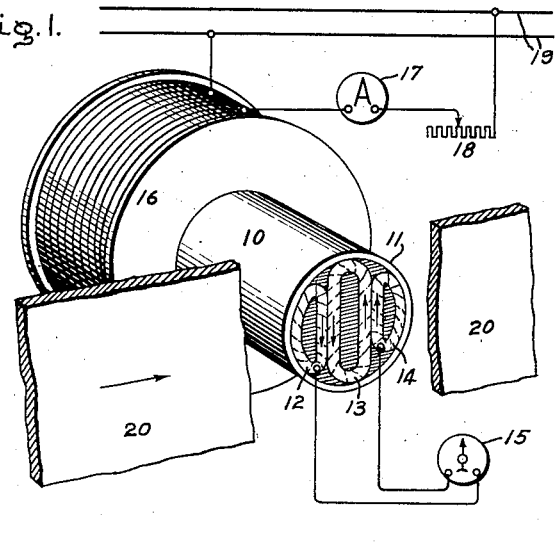
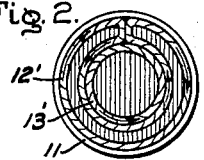
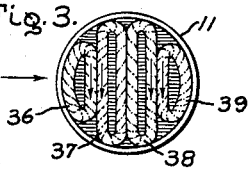
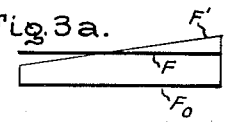
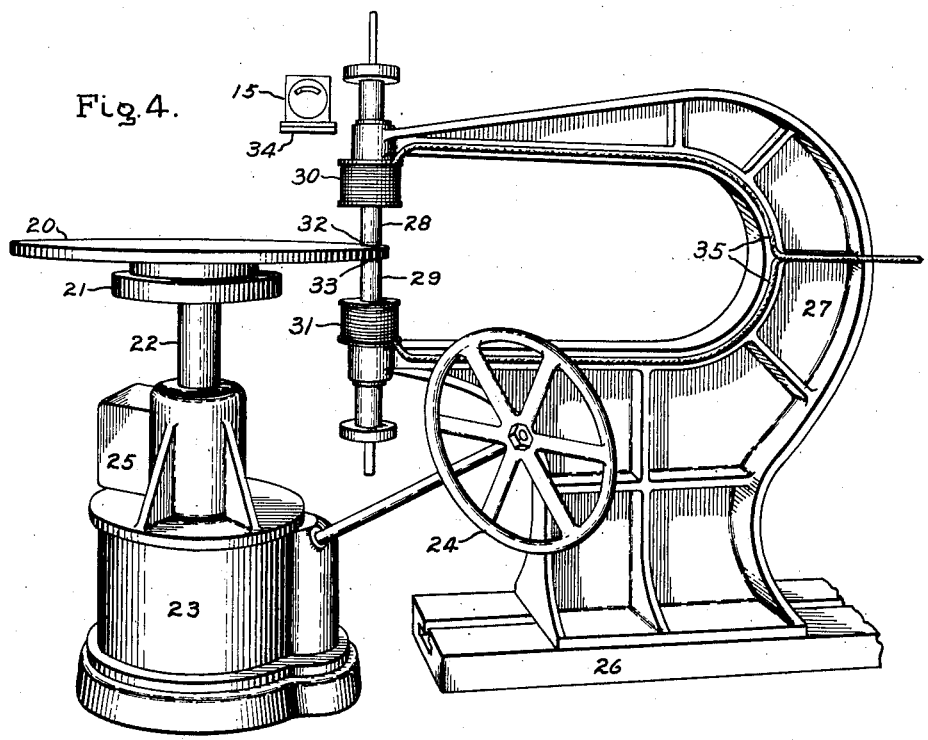
Inventor:
Shankar L. Gokhale,
by
His Attorney.

Patented Jan. 7, 1930

1,742,990

UNITED STATES PATENT OFFICE

SHANKAR L. GOKHALE, OF SCHENECTADY, NEW YORK, ASSIGNOR TO GENERAL ELECTRIC COMPANY, A CORPORATION OF NEW YORK

MAGNETIC TESTING APPARATUS

Application filed October 8, 1924. Serial No. 742,461.

My invention relates to magnetic testing apparatus and in particular to a novel test coil arrangement to be used in connection with a suitable galvanometer for general testing purposes where the test coil is subjected to the influence of a magnetic field to detect certain kinds of changes therein, but is astatic with respect to certain other changes. The invention is particularly adapted to detect irregularities, or blow holes or other flaws in magnetic material.

It has heretofore been proposed to test magnetic material by providing a suitable electromagnet for producing a uniform magnetic field, pass the material to be tested through this field and detect flaws in the material by means of a test coil threaded by the field flux. The test coil is connected to a suitable galvanometer and variations in the reluctance of the material under test causes changes in the magnetic field which induce currents in the test coil and a deflection of the galvanometer.

My invention relates to improvements in such an arrangement whereby variations in the field strength not caused by defects in the material under test and the ordinary effects of hysteresis and eddy currents in the material under test do not produce a deflection of the galvanometer. By means of this improvement, the test may be carried out continuously and no particular precaution is necessary to keep the test field uniform.

In carrying my invention into effect, I provide what I choose to call an astatic wound test coil. This test coil is made up of at least three sections or the equivalent of three sections connected in series and is placed on the face of the magnet adjacent to the air gap through which the material to be tested is passed. When three sections are used, one section may have an effective area equal to the other two sections which then have equal effective areas. The larger section is reversed with respect to the two smaller sections and is placed between them, the smaller sections being placed on the leading and trailing pole portions of the magnet so that each section of the material to be tested passes in succession across the face of the three coil sections. This coil is preferably connected to an overdamped galvanometer which prevents difficulties due to a natural movement of the galvanometer after a deflection and permits the use of photographic apparatus for continuous record.

The features of my invention which are believed to be novel and patentable will be pointed out in the claims appended hereto. For a better understanding of the invention, reference is made in the following description to the accompanying drawing wherein Fig. 1 shows a simplified diagram of the test coil arrangement and its circuit connections, Figs. 2 and 3 represent modifications of the test coil. Fig. 3ª represents certain flux conditions of the coil of Fig. 3 to be referred to and Fig. 4 shows one modification of the apparatus as used for testing turbine wheels.

Referring now to Fig. 1, 10 indicates one pole of a suitable electromagnet. Inserted in the face 11 of the pole is one form of my improved test coil. The test coil is made in three sections, 12, 13 and 14. The central section 13 is wound in the opposite direction to the outer sections 12 and 14, as indicated by the arrows, and the central section has an effective area equal to that of the sum of the effective areas of the smaller outer two sections which are made of equal effective area. By effective area I mean area multiplied by the number of turns. These sections are wound with approximately equal numbers of turns and are connected in series to the galvanometer 15. The electromagnet is provided with a suitable energizing coil 16 which is connected through an ammeter 17 and an adjustable resistance 18 to a source of direct current 19. The electromagnet will preferably be in the shape of a C so as to provide another pole opposite to that of 11, the pole faces being separated by an air gap through which to pass the material to be tested represented at 20. The complete electromagnet is not represented in this figure in order to better show the arrangement of the test coil.

It will now be clear that a variation in flux caused by a variation in the voltage of source 19 will produce no deflection of the galvanometer 15 since a change in flux through coil sections 12 and 14 is equally balanced by a corresponding change in flux through coil section 13.

Now, when the magnetic test piece 20 is passed through the air gap in a horizontal direction as represented by the arrow and assuming for the moment that the test piece subjected to the magnetic field is perfectly uniform and without flaws, the flux lines across the air gap will be crowded towards the direction of movement of the test piece, particularly if it be of hard steel. That is, less flux will thread section 12 and more flux will thread section 14. This is due to the hysteresis and eddy current losses in the material. This condition of affairs does not produce any deflection of the galvanometer 15 because the sum of the fluxes threading coils 12 and 14 still remain equal to the flux threading coil 13, although the flux is unequally distributed over the face of the pole piece in a horizontal direction. The movement of the test piece may be uniformly accelerated and deaccelerated without producing any deflection of the galvanometer 15 since in such case the variation in the flux distribution across the pole face is in itself uniform and the voltages induced in the end coil sections balance the voltage induced in the middle coil section.

When, however, a flaw such as a crack or blow hole in the test material approaches and passes through the air gap, the balanced condition is upset and a resultant current is induced in the test coil sections which causes a deflection of the galvanometer and thus indicates the existance and position of the flaw. I prefer to use an overdamped galvanometer because then the extent and direction of the deflection may be more easily detected and recorded. As a flaw passes under coil section 12, the galvanometer will be deflected a slight amount in one direction; when the flaw passes under section 13, the galvanometer will be deflected a greater extent in the opposite direction, and as the flaw passes under section 14, the galvanometer will be brought back to the original indication. The position of the flaw may thus be determined very accurately.

The broad principle of my invention is not limited to the particular arrangement of the test coil sections as above described. Thus, it will be evident that instead of making the areas of the two outer sections equal to the area of the middle section and the number of turns in each section equal, the mean areas and the number of turns may be made unequal if the product of the area times the number of turns of the central section is equal to the sum of the mean area of each of the two outer sections times the number of turns in said sections. Thus, coil sections 12 and 14 may each have two turns and each enclose an area equal to ¼ the area enclosed by section 13 which will then have only one turn.

With the arrangements as above described, the material to be tested should be passed across the coil sections in succession.

In Fig. 2 I have represented a modification of my invention where the arrangement is such that the material may be carried across the face of the coil in any direction. In Fig. 2 coil sections 12' and 13' enclose equal concentric areas and have the same number of turns but are wound in opposite directions. It will be clear that this arrangement is the equivalent of the arrangement of Fig. 1 and is susceptible to the same modifications. The half of section 12' on the leading portion of the pole is the equivalent of coil section 12 in Fig. 1 and the other half of this section is the equivalent of section 14 of Fig. 1.

The coil arrangement may be carried to a still higher degree of astatism as represented in Fig. 3. Here the pole face is divided into four equal effective areas enclosed by coil sections 36, 37, 38 and 39. Sections 36 and 39 have ⅓ the number of turns of sections 37 and 38. Sections 36 and 38 are wound opposite to sections 37 and 39 and the sections are all connected in series.

It will be clear that a change in the magnitude of a uniform flux threading these coil sections will have no resultant effect. When a test piece is passed across their faces in the direction represented by the arrow, the flux distribution per unit area over the face of the pole may be represented by the line $F'$ of Fig. 3$^a$. In changing from a uniform flux distribution represented by the line F to the nonuniform flux distribution represented by the line $F_1$ section 36 will have induced in it a voltage equal and opposite to that of section 39 and similarly section 37 will balance section 38 and there will be no resultant effect. Now suppose that the flux is changed from zero represented by line $F_0$ to the conditions represented by $F'$. If we represent the average flux strength per unit area of sections 36, 37, 38 and 39 by the letters $a$, $a+b$, $a+2^b$, and $a+3^b$ respectively under the conditions represented by line $F'$, the voltages induced in each section by the change supposed will be proportional to $a$, $3(a+b)$, $3(a+2^b)$ and $a+3^b$; or $a$, $3^a+3^b$, $3^a+6^b$ and $a+3^b$ respectively. The first and third quantities are opposed to the second and fourth quantities and it is seen that the sum of the first and third quantities is equal to the sum of the other two quantities. Consequently the only time there will be a resultant current in the test coil will be when a flaw occurs in the test piece. From what has been said, it will be evident that there are any number of arrangements which will satisfy the conditions that the sum of the flux turns in the coil sections in opposition must be equal for uniform changes in the total flux and also for uniform variations from uniformity across the test coil sections, or in other words, the test coil is arranged to be astatic to these two conditions.

In Fig. 4 I have represented the application of my invention to apparatus especially arranged to test turbine wheels or other disc shaped magnetic material. In this apparatus, the disc 20 to be tested is mounted upon a rotatable pedestal 21 which has a shaft 22 supported in a base 23. The rotatable pedestal may be vertically adjusted by means of a hand wheel 24 connected by means of suitable gearing, not shown, in the base 23 to vertically adjust the shaft 22. A suitable motor 25 is provided and geared to the shaft 22 within the base 23 for rotating the shaft 22 and the parts carried thereby.

The magnetic tester is mounted upon a base 26 and is preferably adjustable towards and away from the pedestal 21. The magnetic circuit of the tester comprises the C shaped frame 27 and pole pieces 28 and 29. The pole pieces are preferably adjustable so as to accommodate discs of different thicknesses between their faces. The magnet is energized by coils 30 and 31 connected in series and supplied from a suitable source in the manner shown in Fig. 1. Preferably two test coils similar to that shown in Figs. 1, 2 or 3 are provided, one in each pole face at 32 and 33. When two test coils are used, the coil sections opposite to each other will be similarly wound and all the sections of both coils will be connected in series to the galvanometer 15 which is shown on a pier 34. The circuit connections to the various coils are preferably carried on the magnetic frame 27, as represented at 35, to the rear part so as to be out of the way. They are then connected as represented in Fig. 1.

In operation the parts are adjusted in position as shown in Fig. 4, the disc 20 is rotated and the test coil apparatus slowly moved radially with respect to the rotating disc. In this way each section of the disc may be passed between the test coils and any flaw or other defect therein is detected and its position determined. Due to the construction of the test coils, the movement of the material under test or variations in voltage of the energizing circuit do not affect the galvanometer; consequently the test piece may be started and the test carried on continuously.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States is:—

1. A test coil having a plurality of sections divided into two oppositely wound groups connected in series, the effective area in said groups being equal, the groups being arranged so that the coil is astatic with respect to a flux change therethrough which uniformly varies from a condition of uniformity across the face of the coil sections.

2. A test coil having a plurality of sections divided into two oppositely wound groups connected in series, the effective area in said groups being equal, the groups being arranged so that the coil is astatic with respect to uniform flux changes and to flux changes which vary uniformly from a condition of uniformity across the face of the test coil sections.

3. Testing apparatus comprising an electromagnet having a pole face, a test coil on said pole face arranged to be threaded by flux from said electromagnet, said test coil having a plurality of coil sections divided into oppositely wound groups connected in series and covering different areas of said pole face, the effective area of said groups being equal, said sections being arranged so that the coil is astatic with respect to flux changes which vary uniformly from a condition of uniformity across the pole face.

4. In testing apparatus, an electromagnet having a pole face, a test coil on said pole face having three coil sections connected in series and covering different areas of said pole face, two of said sections being separated by the other section and wound oppositely thereto, the effective area in the said two sections being equal to the effective area in the central section.

5. Testing apparatus comprising an electromagnet having spaced pole pieces with their faces opposite each other, test coils on said pole faces threaded by flux from said electromagnet and each wound so as to be nonresponsive to uniform flux changes therein as well as to a uniform crowding of the flux lines towards one side of the pole pieces, and an overdamped galvanometer connected in series with said test coils.

In witness whereof, I have hereunto set my hand this 7" day of October 1924.

SHANKAR L. GOKHALE.